United States Patent [19]

Matson et al.

[11] 3,753,656

[45] Aug. 21, 1973

[54] GAS CHROMATOGRAPH

[75] Inventors: James H. Matson, Kent, Wash.;
Robert Goings, Washington, D.C.

[73] Assignee: The United States of America as represented by the Secretary of the Navy, Washington, D.C.

[22] Filed: Apr. 7, 1971

[21] Appl. No.: 132,029

[52] U.S. Cl............. 23/232 E, 23/254 EF, 73/23.1
[51] Int. Cl....................... G01n 31/08, G01n 31/10
[58] Field of Search.................... 73/23.1; 23/232 E, 23/254 EF, 255 E

[56] References Cited
UNITED STATES PATENTS

| | | | |
|---|---|---|---|
| 3,236,603 | 2/1966 | Durrett et al................... | 73/23.1 X |
| 3,298,788 | 1/1967 | Dewar et al..................... | 73/23.1 X |
| 3,438,243 | 4/1969 | Parks et al........................ | 73/23.1 |
| 3,527,567 | 9/1970 | Philyaw et al................... | 73/23.1 X |
| 3,009,060 | 11/1961 | Roehrig............................ | 73/23.1 X |
| 3,152,470 | 10/1964 | Reinecke et al.................. | 73/23.1 |
| 3,201,971 | 8/1965 | Villalobos........................ | 73/23.1 |
| 3,206,968 | 9/1965 | Leggoe et al.................... | 73/23.1 |
| 3,366,456 | 1/1968 | Andreatch et al............... | 73/23.1 X |
| 3,626,761 | 12/1971 | Haruki et al.................... | 73/422 GC |

OTHER PUBLICATIONS

Ettre–"Application of Gas Chromatographic Methods to Air Pollution Studies"44 J. Air Pollution Control Assoc. – 11(1), Jan. 1961, pp. 34–42.

Anderson et al. – "A Gas-Phase Chromatography Sample Injection Device For Use With Gas Samples in the Micron Pressure Range" – Journal of Chromatography (1967) – pp. 480–81 – 73–23.1 pub.

Primary Examiner—Richard C. Queisser
Assistant Examiner—Stephen A. Kreitman
Attorney—R. S. Sciascia and P. Schneider

[57] ABSTRACT

The inventive gas chromatograph employs the response of a flame ionization detector to test air and liquid and gaseous oxygen and nitrogen for the presence and amounts of the following impurities: total hydrocarbons, individual hydrocarbons, carbon monoxide/carbon dioxide, water and freons. The invention is portable and may be used for quality control and quality assurance testing and has a sensitivity in the range of parts per million (ppm) by volume. The invention can accept a low pressure range of gases for analysis and is designed to sample fluids at cryogenic temperatures for a direct analysis from closed piping systems. The invention further utilizes two chromatographic columns, is designed to permit carrier gas backflushing of each of these columns and further features the backflushing of one column into the other column.

15 Claims, 4 Drawing Figures

GAS CHROMATOGRAPH

BACKGROUND OF THE INVENTION

1. Field of the Invention

The present invention relates generally to apparatus for testing gases and liquids for foreign substances and more particularly to devices for testing air and liquid and gaseous oxygen and nitrogen for the presence of impurities.

2. Description of the Prior Art

One of the most critical problems in the production and delivery of gases and liquids for military or commercial purposes is the maintenance of impurities present in these gases and liquids within acceptable limits. For example, the quality of liquid oxygen that is used in aircraft systems to supply breathing oxygen for consumption by flight crews is usually not adequately monitored. Proper surveillance procedures have been devised; but these require sensitive tests for total hydrocarbons, individual hydrocarbons, water, carbon dioxide/carbon monoxide and freons. Flight crew and equipment safety are jeopardized when the liquid oxygen quality is unknown and suspect. To implement the proper surveillance, tests for the above impurities must be accomplished by on-site on in-field operations. Tests for the above impurities have traditionally only been performed in government testing laboratories upon limited samples due to the expense of the testing equipment and its sensitive nature. These tests usually only detected carbon monoxide and methane impurities. For proper surveillance, tests must be performed to detect total hydrocarbons, individual hydrocarbons, water, carbon monoxide/carbon dioxide and freons. Further, on-site or in-field testing is required since liquid oxygen and liquid nitrogen quality at the time of receipt from commercial suppliers cannot be related to the quality of the fluids actually used in aircraft converters since evaporation occurs during storage and results in the increase of impurities in the residual liquids. For a 75% evaporation loss, these impurities increase about fourfold.

Surveillance, using sensitive test equipment, is required to monitor these increases in impurities and to detect when storage tanks, servicing equipment, converters and associated equipment must be purged to avoid delivery of unsatisfactory liquid oxygen to aircraft converters for supplying breathing oxygen for consumption by flight crews.

The amounts and kinds of impurities that a gas contains determines its quality. Previously, several types of instruments were required to obtain the sensitivity required for the detection of impurities in product gases. These instruments are commonly known as the infrared spectrophotometer, moisture monitors, acetylene tester, total hydrocarbon analyzer and gas chromatograph. The limitations and disadvantages in the use of these instruments to determine the quality of product gases are numerous. For example, only methane hydrocarbons and carbon dioxide can be detected by the use of infrared spectrophotometers in analyzing product gases. Hydrocarbons, other than methane, are extremely difficult to detect because interfering absorption bands displayed on a chart can only be interpreted by a chemist trained in spectromethyy. Installation of this device must be in a area that is airconditioned and humidity controlled. A standby electrical source must be provided to insure 24 hour a day service that can be used in the event of power failure. It is not feasible to use this instrument in isolated geographic locations were samples are generated. The high cost and limited effectiveness in determining the amounts and kinds of hydrocarbon impurities in gases and its inability to detect water severely limit the usefulness of this device.

Moisture monitors of the electrolytic type have been used to detect the presence of water vapor in gases. A major difficulty in the use of a device of this type is in stabilizing the instrument since the instrument requires about three days purging with dry nitrogen gas to obtain a zero reading and must be continually dry-gas purged (24 hours a day) except when actually in use. Product gases cannot be successfully tested for the presence of water vapor by using instruments based on the principal of "dewpoint" because high boiling impurities, other than water, will separate out and cause errors in readings. The military specification requirements as far as the presence of water in liquid oxygen or liquid nitrogen is for a maximum of 6.75 parts per million; but the individual monitoring of the quality of these fluids requires an instrument to be sensitive to about 1 part per million for purposes of detecting build-ups in the liquid oxygen or liquid nitrogen storage tanks. When the liquid oxygen or liquid nitrogen contacts atmospheric air prior to its vaporization for test by the old methods, moisture or liquid air is formed which carries in atmospheric water. A closed system of sampling the liquid oxygen and subsequent vaporization to gas must be used to insure that tests for water vapor represent the actual moisture condition in the liquid oxygen or liquid nitrogen.

The acetylene tester is used by field personnel for testing cryogenic fluids. It is a colorimetric type of test using the "isolvay" reaction. This device cannot be calibrated by using acetylene in liquid oxygen; and its effectiveness in testing liquid oxygen for acetylene using nitrogen gas with acetylene standards is questionable. Although this device is widely used, it has never resulted in a positive reaction in liquid oxygen produced by the Navy or Marine Corps.

The total hydrocarbon analyzer is operative to automatically and continuously determine the hydrocarbon content of a gas stream. Usually, this device utilizes the flame ionization method of detection. One important drawback of this device is that it does not discriminate along the various types of hydrocarbons detected and is insensitive to carbon monoxide/carbon dioxide and water. This instrument detects the total ionization properties of a product gas stream in relation to "methane equivalents" established when calibrated by a reference gas of known total hydrocarbon content. The device furnishes useful information in regard to an overall condition of contamination with hydrocarbons but cannot be used to satisfy requirements for determination of individual hydrocarbons, carbon monoxide/carbon dioxide or water which are needed for quality surveillance in military specification compliance needs.

Prior art gas chromatographs have characteristics that are not suitable for in-field use. For example, to detect the presence of all of the impurities referred to above at the required sensitivities, parts per million (ppm), several types of detectors for eluted constituents are needed. For carbon monoxide/carbon dioxide determinations, an electron capture type is required. This detector requires Atomic Energy Commission licenses; and its use of radioactive material is not desirable for general use in detection equipment. Flame ionization detectors are required to obtain proper sensitivity to hydrocarbons but are insensitive to water and carbon monoxide/carbon dioxide. A thermoconductivity detector for water or carbon monoxide/carbon dioxide is not sensitive in the required range, parts per million. Usually, the gas chromatographs are not capable of detecting the presence and amount of total hydrocarbons. Thus, accessory equipment must be provided for this purpose. Usually, means are not provided to reverse the flow of carrier gas in a chromotagraphic column after certain components are eluted. Thus, the analysis is prolonged until all trace gases of highly retained compounds are eluted from the columns. Also, usually no provisions are available to backflush one column into a second column containing a special packing for resolving certain constituents that are difficult to elute in the first column.

Generally, in order to perform a complete analysis, the analyst is required to use several types of detection devices in order to obtain a complete analysis of the product gas for all of the impurities of interest. Military activities located at isolated areas have special problems of an environmental nature. These activities cannot successfully use laboratory types of testing gear to detect impurities in product gases they generate and use. Thus, samples of gases produced by these activities must be transported to government laboratories for tests. This procedure is obviously inconvenient and unsatisfactory. The special types of detection devices used commercially for quality control of liquid oxygen and liquid nitrogen at generating plants cannot be feasibly used for military in-field operations since operators trained in the use of these commercial devices cannot be provided for in-field operations. As a result, gas products are produced and used without the benefit of proper surveillance tests to insure that their quality meets the desired requirements.

SUMMARY OF THE INVENTION

The inventive detection apparatus is designed to eliminate the above problems. It provides in an inexpensive, portable device, suitable for in-field use, a flame ionization detector capable of analyzing product gases and liquids for total hydrocarbons, individual hydrocarbons, carbon monoxide/carbon dioxide, water and freons. Detection of the kind and amounts of these impurities can be accomplished by in-field operations at the sensitivity range required, parts per million. The invention can analyze gases in the low pressure range of 0 to 4 PSIG, for example, atmospheric air being used by a liquid oxygen generating plant, oxygen being furnished to breathing masks by aircraft oxygen systems and gas collected in bags from various low pressure gas sources. Further, the invention utilizes a probe to analyze liquid gases at cryogenic temperatures and vaporizes these to attain the gaseous state within an evaporating coil for a direct analysis from the closed piping system. The invention further provides for carrier gas backflushing of either one or both of its gas chromotagraphic columns and also allows one column to be backflushed into the other column. Thus, advantageous procedures can be used when the carrier gas flow direction through a column can be changed by the analyst any time desired as appropriate to findings during an analysis. Constituents that are held up as a characteristic of a particular type of packing used in one column can be backflushed out for detection through the second column. As a result of these backflushing design provisions, it is possible to use in one column a packing for eluting a particular hydrocarbon and in the other column a packing that elutes the balance of the hydrocarbons of interest. This feature greatly extends the use of the gas chromatographic detection method and requires a minimum number of specially packed columns to solve elution problems.

The invention can further detect water in product gases and cryogenic fluids by use of a flame ionization detector at a sensitivity of from 1 ppm to 5,000 ppm. When this flame ionization detector is used, no calibration gas is needed; and a small test sample can be analyzed and the water content determined without the risk of atmospheric water vapor contamination which was present with the use of the old sampler detection devices.

A further advantage of the invention is that it is able to detect carbon monoxide/carbon dioxide with the use of a flame ionization detector. This permits detection at sensitivities of from 1 ppm to about 300 ppm. The invention is able to analyze oxygen samples by providing a continuous reducing atmosphere of hydrogen to pass over a nickle catalyst. By means of a probe, liquid phases of air, oxygen and nitrogen at cryogenic temperatures may be analyzed without the possibility of contamination from outside sources.

A further feature of the invention is that the mass flow of gas to the inventive detector is duplicated when the gas sample pressure and temperature in a controlled space are duplicated. The determination of the amount of hydrocarbon content of a gas sample is based on the inventive detector's response to a calibration gas compared to its response to the gas sample. The accuracy of this determination is dependent upon furnishing identical mass flows to the inventive detector in each case. Identical mass flow for the gas sample in the calibration gas can only occur when both the temperature and pressure of the gas sample is reproduced at the up-stream side of a sample capillary and the temperature of the capillary is reproduced. This new inventive feature results in increased reliability of tests by having all component parts of the apparatus that are in contact with the sample gas maintained at a controlled temperature at a suitable elevated temperature above ambient.

The invention further features one temperature sensing unit in one compartment with one on-off control for controlling the temperature in several areas of the invention. To accomplish this, a constant flow of air is circulated from an enclosed controlled zone of the equipment compartment across a heating element that is on-off controlled and back into the controlled zone.

OBJECTS OF THE INVENTION

An object of the present invention is the provision of a single, portable and inexpensive device to detect the kinds and amounts of impurities present in liquids and gases.

Another object of the invention is to provide in an single device means for analyzing liquids and gases for total hydrocarbons, individual hydrocarbons, carbon monoxide/carbon dioxide, water and freons.

A further object of the invention is the provision of testing apparatus to analyze gases of a very low pressure.

Still another object of the invention is to provide means for sampling liquid gases at cryogenic temperatures making possible a direct analysis from a closed piping system to thereby reduce the risk of contamination resulting from the liquid gas coming into contact with atmospheric air.

A still further object of the invention is the provision of means to accomplish carrier gas backflushing of either one or more chromatographic columns.

An even further object of the invention is the provision of means for backflushing the carrier gas from one chromatographic column into another chromatographic column.

An even further object of the invention is the provision of a differential amplifier for applications of the invention involving the use of dual flame ionization detectors or for use as a variable gain amplifier if more sensitivity is required.

A still even further object of the invention is the provision of means for detecting the presence of water in gases and cryogenic fluid by use of a flame ionization detector at a sensitivity in the range from 1 to 5,000 parts per million, thus, eliminating the need for a calibration gas and the risk of the atmospheric water vapor contamination.

Still another object of the invention is the use of flame ionization detector to detect carbon monoxide/carbon dioxide presence in oxygen gas samples by permitting a continuous reducing atmosphere of hydrogen gas to pass over a nickle catalyst.

A still further object of the invention is the provision of means to duplicate the mass flow of a gas sample to the inventive detector.

An even still further object in the invention is the provision of one temperature sensing unit for temperature control in several distinct areas of the invention.

Still another object of the present invention is the provision of means for ensuring against any possible explosive accumulation of hydrogen gas in a confined space.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
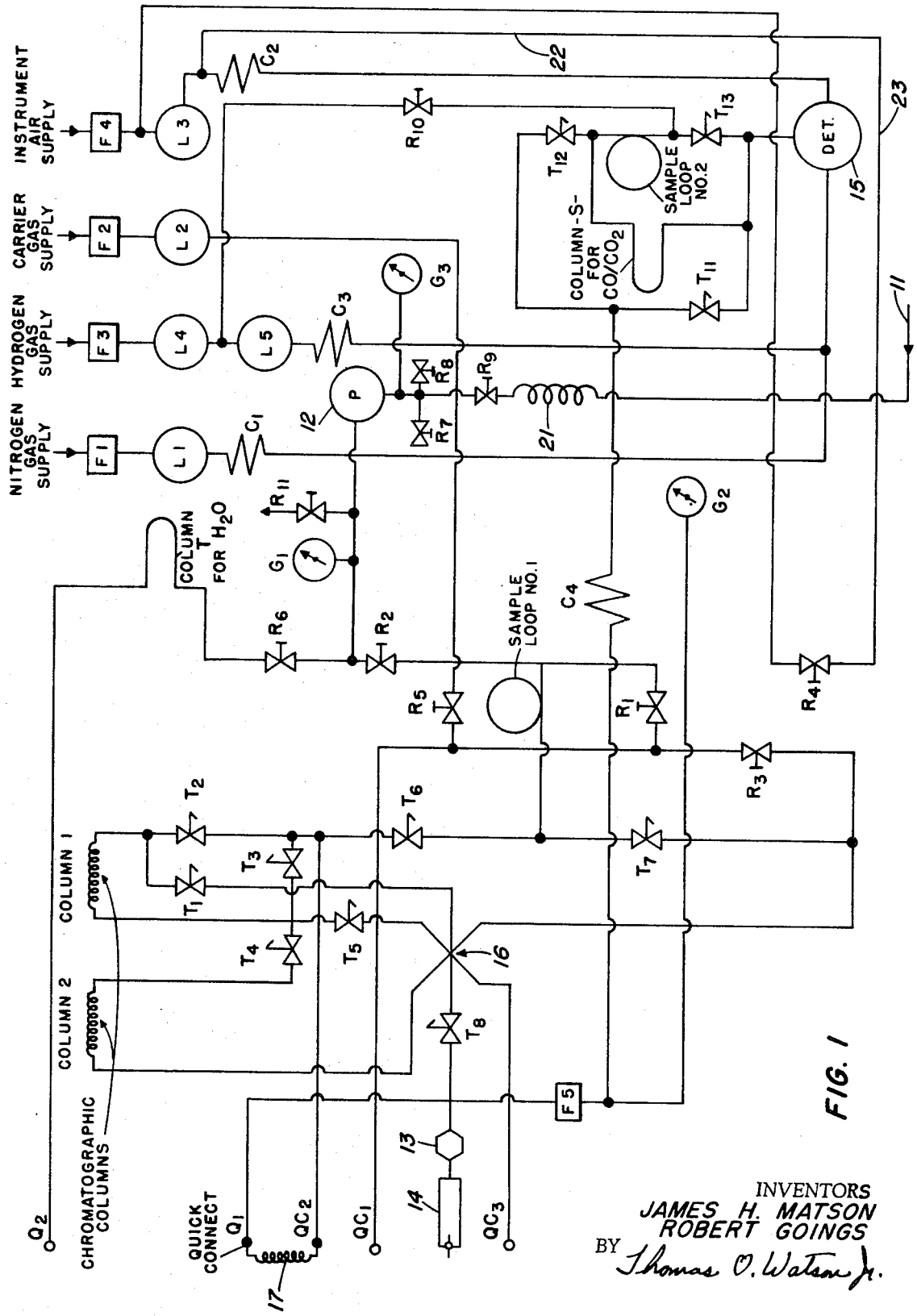
FIG. 1 illustrates in flow diagram form a preferred embodiment of the inventive gas chromatographic.

FIG. 1 illustrates a preferred embodiment in flow diagram form of the tubing, valves, columns, coils, mechanical filters, regulators and gages of the instant invention. Q1, Q2, QC1, QC2 and QC3 are quick connections that provide external access to the internal components of the inventive chromatograph located within a suitable housing chassis. T1, T2, T3, T4, T5, T6, T7, T8, T11, T12 and T13 are toggle valves and R1, R2, R3, R4, R5, R6, R7, R8, R9, R10 and R11 are regulating valves, all of which are used to control the flow of the gases and fluids within the instant invention. Sample loops 1 and 2 are piping loops through which the gas to be analyzed is caused to flow. Chromatographic columns 1 and 2 are used to determine the individual constituents of the gas under test. Sample line 11 is used to collect cryogenic (liquid) samples for analysis. Suction pump 12 draws the liquid through the sample line 11. Vaporizing coil 21 is kept at a temperature above the ambient in order to vaporize the cryogenic liquid to its gaseous phase.

G1 is a pressure indicator that indicates the pressure of the gas under test. G2 is also a pressure indicator that indicates the pressure of the gas under test at a point upstream of sample capillary C4. G3 is a vacuum and pressure indicator located on the input line of sample pump 12 for indicating the vacuum and pressure of the gas under control of valves R7, R8 and R9. R9 regulates the gas flow to sample pump 12. R8 may be connected to a nitrogen gas supply in order to supply dry gas to purge R9 and vaporizing coil 21 and also to purge column T via Q1 and Q2. R7 may be utilized as an intake valve for introducing gas samples that are 0 to 5 PSIG. R11 is a sample gas pressure release valve that is used to adjust the pressure at gage G2 when the gas flow rate exceeds the by-pass capacity of back-pressure regulator 13. Q1 provides external access to the sample gas capillary C4 from an external port of the chassis.

T8 is used to control the flow from chromatographic column 1. When T8 is closed the sample gas flow is directed for total hydrocarbon (THC) analysis to the detector 15 via filter F5, which prevents clogging of the sample capillary C4, sample capillary C4 and valve T11. Further, when valve T8 is closed, backflushing of chromatographic column 2 may be accomplished. The back-pressure regulator 13 provides regulated pressure of the sample gas on the upstream side of capillary C4 to insure that a specific flow rate of the sample gas is delivered via T11 to the detector 15 for each pressure setting indicated at G2. Rotameter 14 indicates the by-pass flow rate from the regulator 13 to exhaust. The sample capillary C4 is used to regulate the sample gas flow to the detector 15 in accordance with the upstream pressure manually selected at 13. R10 is a regulating valve that is used to control the hydrogen gas by-pass of approximately 15cc per minute to reduce NiO to Ni and to provide carrier gas supply for carbon monoxide/carbon dioxide analysis. Valve T11 is maintained open during the analysis of the sample gas for total hydrocarbons (THC) and to pass chromatographic elutions and the total hydrocarbons and acetylene obtained from $H_2O$ conversion by column T. Valve T11 is maintained closed when $CO/CO_2$ is being converted by column S and the sample loop 2 is being filled via the open valve T12. Valve T12 provides the means to direct the sample gas flow from capillary C4 to sample loop 2 with T13 open.

Column S is packed with nickel catalyst to convert carbon monoxide/carbon dioxide to methane via the reaction: $CO/CO_2 + H_2 \rightarrow CH_4 + H_2O$. Column T is packed with $CaC_2$ to convert water to acetylene via the reaction: $H_2O + CaC_2 \rightarrow Ca(OH)_2 + C_2H_2$. Q2 provides an outlet for column T when an analysis for water is being made on the sample gas. Q2 is then usually connected to Q1 via an external connection. R6 is used to control the flow of the gas in column T. The valve T13 is maintained open when sample loop 2 is being filled and for THC analysis when T11 is open and T12 is closed. Valve 13 is maintained closed when carbon monoxide/carbon dioxide analysis of the sample gas is being made by the hydrogen carrier gas flow through sample loop 2. The detector 15 is of a flame ionization type. The choice of a specific flame ionization detector is not critical; in a preferred embodiment, a Beckman flame ionization detector may be used with a fuel mixture of 60 percent nitrogen gas and 40% hydrogen gas at a flow of 100cc per minute.

The instrument air supply supplies air to the detector. At start-up, 100cc per minute is required; after ignition of the flame ionization detector, 300cc per minute is required. The nitrogen gas supply supplies nitrogen gas to the detector as a diluent for hydrogen gas for defusing the flame and for reducing the heat from the reaction: $2H_2 + O_2 \rightarrow 2H_2O$ at the burner tip. A supply of 60cc per minute is required. The hydrogen gas supply supplies hydrogen gas as the active burning fuel element for the detector and as the reduction/carrier gas supply for column S.

L1, L2, L3, L4 and L5 are line flow regulators. C1, C2 and C3 are gas capillaries. F1, F2, F3 and F4 are filters used to remove any dirt or foreign particles from the gas drains which could cause plugging of the C1, C2 or C3 capillaries. Lines 22 and 23 and R4 provide a by-pass for the instrument air around the regulator L3. The line pressure is adjusted to permit the capillary C2 to deliver 300cc per minute with R4 open. During start-up (or at any time of ignition of the detector), valve R4 is closed; after ignition takes place, R4 is opened.

The pressure downstream of line regulator L1 is set by a manual control to provide the proper pressure upstream of capillary C1 thus fixing the desired amount of nitrogen gas (about 60cc per minute) to flow to the detector 15. The pressure downstream of line regulator L2 is manually set to provide the desired flow rate through the chromatographic columns 1 and 2. The flow rate may be varied according to the type of carrier gas used and the temperature of the columns to produce the proper profiles of peaks on the strip chart recorder (FIG. 2) and flame response of the detector 15 to suit the type of hydrocarbon being tested for. Since the resistance to flow by the columns varies, L2 is usually adjusted to obtain the pressure readout required from the gage G2 for the desired gas flow to the detector 15 plus the by-pass to the rotometer 14. The pressure setting of line regulator L3 provides the proper pressure upstream to capillary C2 for delivery of approximately 100cc per minute of instrument air to the detector's instrument air port. The flow rate of 100cc per minute is start-up requirement at time of ignition of the hydrogen gas/nitrogen gas fuel for the Beckman detector. The line regulator L4 is manually adjusted to provide a constant upstream pressure on the valve R10, which in turn is adjusted to furnish a constant flow rate of approximately 15cc per minute of hydrogen gas to the nickel catalyst in column S. Line regulator L4 further provides a constant pressure upstream on line regulator L5. Line regulator L5 is adjusted to furnish the proper pressure upstream on capillary C3 to permit delivery of approximately 25cc per minute of hydrogen gas to the detector 15.

When the carrier gas utilized is zero air (under 0.5 THC), the line regulator L2 and valve R5 are used to purge the system and to obtain a 0 scale response on the recorder (FIG. 2) to the detector's output for 0.5 THC carrier gas. The valve R1 is used to supply carrier gas to sample loop 1. R2 controls the sample gas input to sample loop 1. R6 controls the flow of sample gas to column T for determination of $H_2O$ content. R3 and R5 control the purging gas flow to column T and chromatographic columns 1 and 2. Toggle valve T7 serves as the by-pass for the chromatographic columns 1 and 2. In order to forward sweep chromatographic column 1, T1, T3 and T8 are placed in the open position; and the carrier gas via R1, internal sample loop 1 and T6, or optionally, via QC1, QC2 and external sample loop 17 can forward sweep chromatographic column 1. In order to backflush chromatographic column 1, T3 is closed and T2, T5 and T8 are opened, the forward direction of carrier gas through column 1 now being reversed (backflushed). In order to backflush chromatographic column 1 into chromatographic column 2, the valves are set as above except that T5 is closed and T4 is opened. In order to forward sweep chromatographic column 2, T3, T4 and T8 are switched to the opened position and T5, T1 and T2 are switched to the closed position. In order to backflush column 2, QC1 is externally looped with QC3; QC2 is externally looped with Q1; T4, T3 and R5 are switched to the open position and all of the other valves are switched to the closed position.

Figures 2, 4:
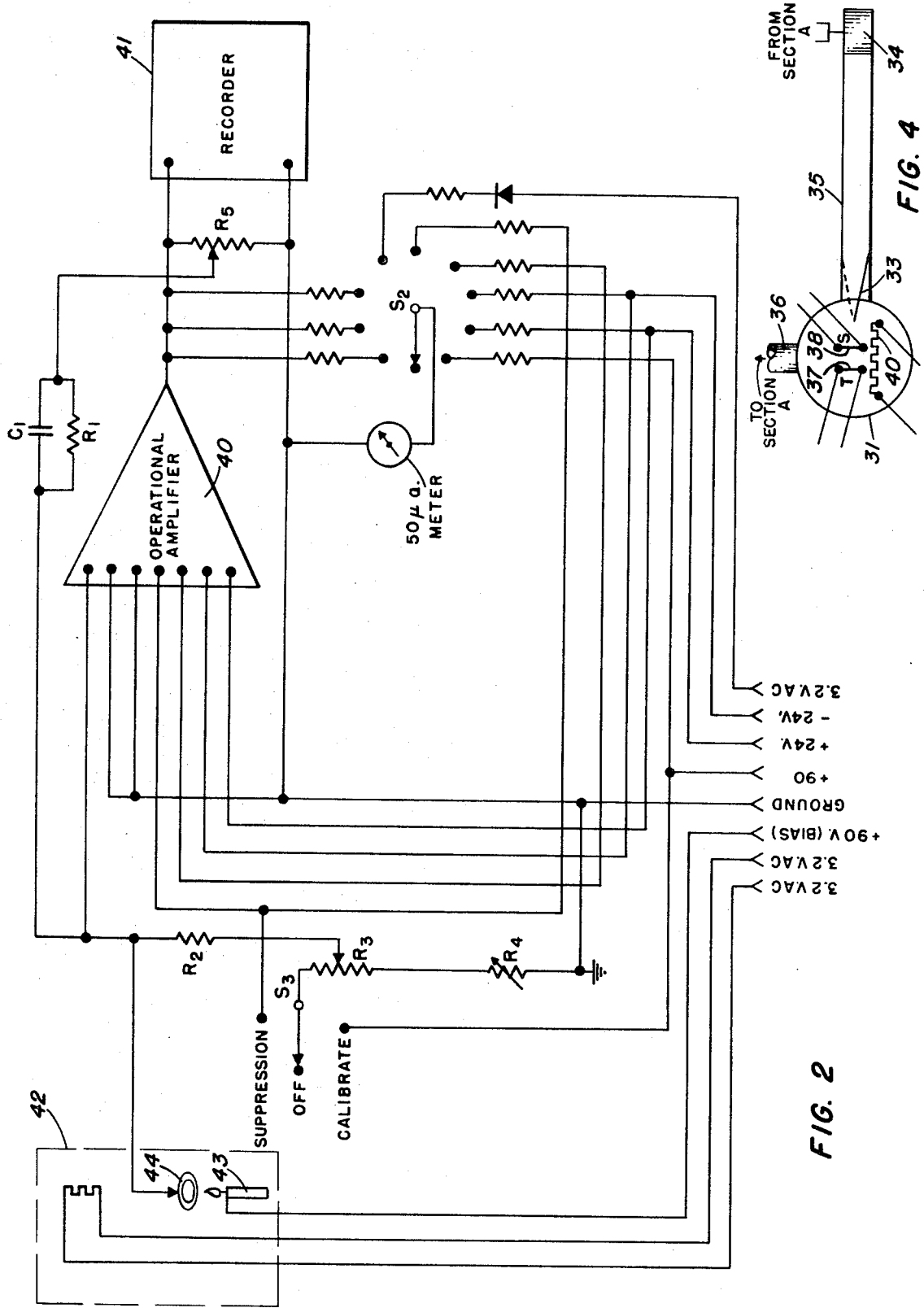
FIG. 2 illustrates in schematic form a preferred embodiment of a high impedance voltmeter or electrometer used to monitor the output of the flame detector of the instant invention.
FIG. 4 illustrates a preferred embodiment of the heating means used to maintain various areas of the instant invention at their optimum operating temperatures.

FIG. 2 illustrates a preferred embodiment of a high impedance voltmeter or electrometer that may be used with the instant invention. The electrometer is used to monitor the output of the flame detector 15 of FIG. 1. The electrometer is a solid state device which consists of an operational amplifier (for example, a Keithley model 301K) modified by the addition of systems test, feedback and suppression networks. Suppression currents are obtained from the built-in −15 volt regulator and the network consisting of $R_2$, $R_3$ and $R_4$ while feedback currents are obtained primarily from the network consisting of $R_1$, $C_1$ and $R_2$. By rotating the switch $S_2$ through all ranges, the system test circuit monitors all important operating voltages and provides the operator with a means of isolating circuit faults. $R_5$ provides internal gain adjustment but is not used for most applications. When the system is used as shown with $R_5$ in the "all out" position, the electrometer has approximately unity gain with phase inversion in a dynamic range in excess of 100db. It can detect currents of $10^{-13}$ amperes in the presence of background currents up to $1.5 \times 10^{-9}$ amperes and has the capability of detecting currents as low as $1.0 \times 10^{-14}$ amperes when used with other recording and/or monitoring systems.

When a gas sample containing hydrocarbons is injected into the flame 43, ions migrate to the collector 44 of the flame detector 42. The ions cause a small current to flow which develops a voltage at the input terminals of the amplifier 40. This voltage is amplified with phase inversion and is fedback through the $R_1C_1$ network. At frequencies below the cutoff frequency, which is a function of $R_1$ and $C_1$, the feedback ratio is nearly unity and the output is approximately equal to the negative of the input. As the output current increases, the maximum output is limited by the biasing voltages of the operational amplifier. Because the current resolution of the amplifier ($1.0 \times 10^{-14}$ amps) and the narrow bandwidth (1 cps or less) used for hydrocarbon analysis, the minimum detectable signal is primarily a function of the display characteristics of the recorder 41 and has been measured as one scale division or 100 microvolts for the 5 millivolt scale of the HP 680 recorder.

Figure 3:
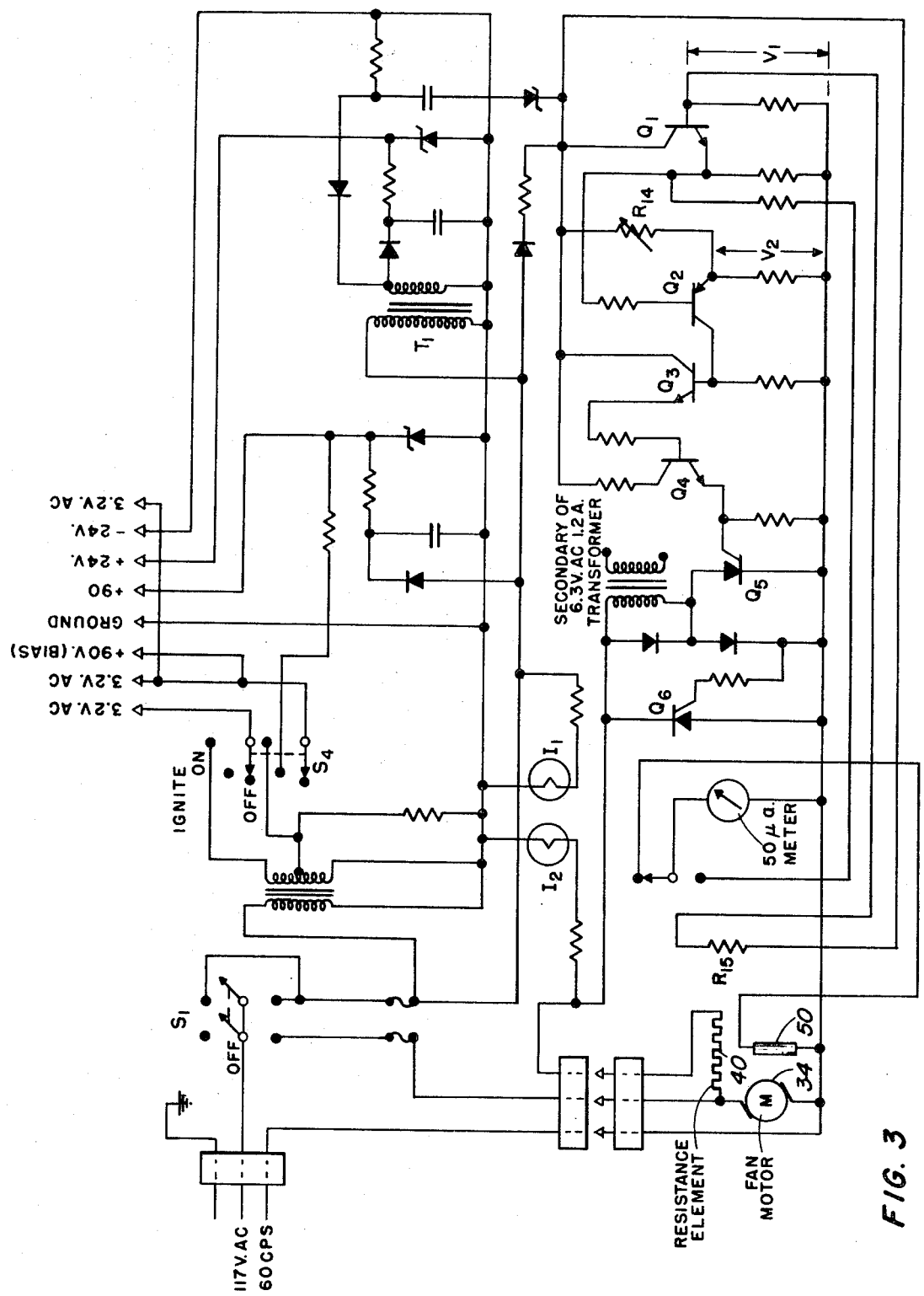
FIG. 3 illustrates in schematic form a preferred embodiment of the power supplies used for biasing and for controlling the temperature of various areas of the instant invention.

FIG. 3 illustrates a preferred embodiment of the power supplies and temperature controller that may be used in the instant invention. Only the temperature controller will be discussed since the remainder of the circuit is conventional. The temperature controller is of the on-off type and consists of a thermistor sensing element 50, a four stage amplifier and a voltage controlled SCR switch. A resistive biasing network provides an input to the amplifier with a coefficient of approximately 300 MV/C degrees while a further resistor is used to set the operating or reference temperature at which the circuit will disconnect power from the load. Transistor Q2 provides about 40db voltage gain while $Q_1$, $Q_2$ and $Q_3$ are used primarily for isolation and current amplification. $Q_5$ and $Q_6$ are SCR switches that provide fullwave conduction of the 117 volt, 60cps input voltage.

If $V_2$ is greater than $V_1$, the current flowing through $Q_1$ causes $Q_2$, $Q_3$ and $Q_4$ to become forward biased on the positive half of the AC cycle. When the output of $Q_4$ reaches the triggering level of $Q_5$, power is connected to the load through $T_1$. At the end of the positive half cycle, the magnetic flux of $T_1$ collapses and induces a voltage to trigger $Q_6$ which connects power to the load on the negative half cycle. This action is continuous until the temperature reaches a predetermined setting as set by $R_{14}$. $R_{15}$ is a thermistor used to sense the temperature. At this point, $Q_2$, $Q_3$ and $Q_4$ cease conducting which permits the ready indicator $I_1$ to flow. $I_1$ is a neon bulb that is used to indicate when the temperature has reached the desired setting. $I_2$ is also a neon bulb that is used to monitor AC input power.

Prior to applying power to the FIG. 2 and FIG. 3 circuits, precaution should be taken to avoid damage to the recorder 41 by placing $S_1$, $S_3$ and $S_4$ in the off position, the recorder range switch (for a HP 680 recorder) in the 100 volt position and by rotating $R_3$ and $R_4$ to their maximum positions. $S_1$ is a double pole, double throw toggle switch with center off which allows the system to operate with or without the heater power. $S_2$ may be a 10-position rotary switch. $S_3$, a single pole, double throw toggle switch with center off, is used to select either suppression or calibration voltages. $S_4$ is a two-deck wafer switch with a momentary on (ignite) position.

$S_1$ may be used to turn system power on; and sufficient time should be set aside to allow the system to stabilize. The recorder range switch of the HP 680 recorder should be rotated to the 5 millivolt position and the pin should be placed at 10 percent of full scale deflection. $S_2$ should be placed in the suppression position and the deflection of the recorder now should not exceed 100 microvolts. $S_2$ then should be switched to the calibration position and $S_3$ placed in position 4 with the recorder range switch on the 10-volt position. The recorder and indicator may now be calibrated by in turn varying $R_4$ and $R_3$ from a maximum to a minimum position. Finally, $R_3$ and $R_4$ should be rotated to their maximum positions and the gas in the flame detector ignited by placing $S_3$ in its ignite position. The flame detector should be allowed to stabilize; and the background currents that result from burning the gases should be suppressed to zero on the recorder's 5 millivolt scale. The device is now ready to analyze the sample gases.

FIG. 4 illustrates a preferred embodiment of a heating compartment used to maintain various elements of the invention at a temperature above ambient. The heater oven 31 of FIG. 4 provides a heat exchange for air pumped by the turbine fan 34 from and to section A. Oven 31 also provides a hot zone for maintaining column S at approximately 500°F and column T at approximately 460°F. Certain components of the instant invention may be physically located or packaged in different enclosures. Section A refers to a housing or enclosure for those elements of the invention which are desired to be maintained at a temperature above the ambient. For example, section A may contain chromatographic columns 1 and 2, external sample loop 17 and internal sample loop 1. Columns S(38) and column T(37) are maintained at their desired elevated temperatures by the resistance element 40. The control circuit for resistance element 40 has been described above in reference to FIG. 3. 35 and 36 represent air ducts leading respectively from and to section A. 33 is an air intake directional damper. In order to quickly heat the heater oven 31 to the desired temperature for an analysis, the air intake directional damper 33 is set as shown by the dotted line in FIG. 4. When the heat control cycles (on-off), the damper 33 is moved to a midway position within the air intake permitting the heater oven 31 to be heated by resistance element 40 at a low rate of air flow. The S and T columns are thus heated to the required temperature. The temperature of the heater oven 31 is monitored by thermocouple 50 (FIG. 3). If the temperature of thee heater oven is too little or too great, an adjustment of the directional air intake damper 33 accomplishes the required correction. A more rapid cycling of the on-off heat control is accomplished when the position of the damper 33 favors a maximum heating path for air shown as the solid line 33 in the duct 35 compared to the cycling speed when the maximum heating of the heater oven 31 is accomplished by the damper 33 in the position shown as the dotted line in duct 35.

As a safety precaution to insure against any possible explosive accumulation of hydrogen gas in a confined space, for instance, in the event of a detector flame-out in which case the hydrogen gas would not be burned to $H_2O$, the detector 15 (FIG. 1) should be located outside of any confined compartment and a provision made for its exhaust to be ported away from the device. The operator may not be observing the detector's performance at all times and therefore would not have an instant awareness when a flame-out occurs. If the detector were inside a confined compartment, a dangerous explosive mixture of hydrogen gas and air would occur by a flame-out.

Operation of the invention requires start up, calibration, determination of the total hydrocarbon content (THC) and then determination of $CO_2/CO$, $H_2O$, individual hydrocarbons and freons in any sequence after the determination of THC. After the detector 15 is sensitized, its response to hydrocarbons is calibrated with gas standards that have a known hydrocarbon content. Flow rates through the sample capillary C4 must be identical for the sample analyzed and the gas used to calibrate the detector 15 and recorder 41 for all THC analyses. When areas under a strip chart recorder's peaks are used to determine individual hydrocarbons and freons (or CO₂/CO), calibration with standard gas/gases with a known content of the hydrocarbon constituents of interest must also be used. The sample gas flow chosen for use with the detector during calibration for peak areas must also be used during analysis.

Calibration of the device involves both zeroing and spanning. Zeroing is accomplished by adjusting the suppression voltage of the electrometer (FIG. 2) for a net zero response during the time that a sample of very low hydrocarbon content is supplied to the sensitized detector. Spanning is accomplished by switching from the zero gas sample to a gas sample with a known total hydrocarbon content and noting the up-scale response on recorder 41. The detector's response to a standard sample with a known hydrocarbon content furnishes the basis to detect the hydrocarbon content of product gas samples. If the principal component of the gas to be analyzed is air, an air calibration gas should be used to obtain the calibration readings. If oxygen is the principal component, an oxygen calibration gas should be used.

The detector is sensitized by turning on the electrical and electronic circuits (FIG. 2 and 3) and supplying the detector's ports with hydrogen, nitrogen and instrument air. For ignition, the instrument air flow rate is about 100cc per minute (for a Beckman type flame ionization detector). Valve R4 is closed. The gas flowing through the detector is ignited by applying a voltage across the ignition wires enclosed in the detector. After ignition takes place, polarization voltage should be supplied to the burner tip and the ignition wires of the detector; and valve R4 should be opened to change the instrument air flow rate from 100cc per minute to approximately 300cc per minute. If the recorder 41 responds with an up-scale reading, the gases are burning and the detector is sensitive. The detector is now sensitized and calibration (zeroing and spanning) as described above is the next step to be accomplished.

In order to analyze a sample gas for total hydrocarbon content (THC), the following procedure may be followed. The sample gas or liquid to be tested is introduced into the apparatus through either probe line 11, valve R7 or external connection Q1 at a pressure of about 4 PSIG. When Q1 is used, T8 should be closed. When R7 or probe line 11 is used, R2, T7 and T8 should be opened. All other valves are closed. The back-pressure regulator 13 should be adjusted to attain the same pressure (G2) upstream on capillary C4 that was used to zero and span the apparatus. Next, valve T11 should be opened; and the flame ionization detector's response to the sample should be read on the recorder. THC for the sample is found by the relationship:

$$\frac{\text{THC of calibration gas}}{\text{Response of detector to THC of calibration gas}} = \frac{\text{THC of sample gas}}{\text{Response of detector to THC of the sample gas}}$$

The following procedure may be used to analyze a sample gas for CO₂/CO content. Since the flame ionization detector is nonresponsive to CO₂/CO, the invention provides for a conversion to CH₄ (methane) which can be detected using the reaction:

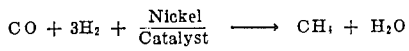

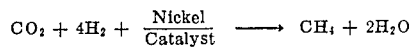

There are several ways to bring this reaction about. The gas sample for a CO₂/CO analysis should be introduced into the apparatus as discussed above for the THC analysis. When low CO₂/CO content is expected, T12 and T13 should be opened. After the response to THC is noted on the recorder, T13 should be closed and the increased response on the recorder from CO₂/CO conversion to CH₄ noted. The following calculation may be used to determine CO₂/CO content:

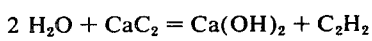

For high CO₂/CO content, proceed as above with T12 and T13 open. After the THC response is noted, close T12 and T13. The gas sample forming in the line is trapped in the loop between T12 and T13; and it is now swept into the column S by the hydrogen carrier gas. The CO₂/CO is converted to methane which increases the sum of the THC content. The increase in the area under the response curve shown on the recorder is compared to the THC of a calibration gas which contains both carbon dioxide and hydrocarbons. When this procedure is used, calibration of THC peak by gas with a known CO₂/CO content and THC is required. The calculation of CO₂/CO content of the sample under test is performed by determining the ratio of areas under the curves obtained for THC on the test sample plus its CO₂/CO content.

An optional method of determining CO₂/CO content is as follows. During the elution of specific gas components from chromatographic column 1, the carbon monoxide and carbon dioxide gases in the sample gas reach valve T12 at specific times. When these times occur, T12 is opened; and T13 is closed. The resulting peaks on the recorder are the equivalent methane responses of the detector to carbon monoxide and carbon dioxide impurities. When this optional method is used, the CO₂/CO content of the carrier gas must be nearly zero.

The following procedure may be used to analyze a sample gas for water content. Since a flame ionization detector is insensitive to water vapor, the water content of the sample gas is determined by the following reaction which takes place in column T:

$$2 H_2O + CaC_2 = Ca(OH)_2 + C_2H_2$$

The acetylene is detected by the flame ionization detector by a response that is 2.6 units (carbon number) for each of the carbon atoms of the acetylene molecule, compared to one unit for the aliphatic type for each carbon atom in the molecule. The increase in total hydrocarbons of the sample gas under test (methane equivalents) that results from the addition of acetylene from the water reaction in column T on CaC₂ is the basis used for determination of water content. The additional THC response is calculated in water equivalents by the gas laws as follows:

$2H_2O$ moles = $36/18 \times 22.4$ liters = 44.8 liters of gases
$C_2H_2$ moles = $26/26 \times 22.4$ liters = 22.4 liters of $C_2H_2$
1ppm $H_2O$ = $22.4/44.8$ = 0.5ppm $C_2H_2$
Therefore, "methane equivalents" of 0.5ppm $C_2H_2$ = (2.6) (0.5) ppm (or 1.3 THC). Thus, each ppm $H_2O$ in the gas being analyzed will account for a 1.3 methane equivalent increase in the detector's response. The calculation for water content is as follows:

$$\frac{\text{Increase in detector's response for THC}}{1.3} = \text{p.p.m. } H_2O.$$

A specific operational procedure for determining water content of a sample is as follows. After purging the lines and column T with dry nitrogen gas, the gas sample is introduced into column T via valve R6. Q2 is connected to Q1 by external sample loop 17, thus, permitting flow from R6 to sample capillary C4 and back-pressure regulator 13. R6 is adjusted to permit approximately a 30cc per minute flow through column T which in turn is divided into a 10cc flow of the sample gas through capillary C4 in a 20cc by-pass of the sample gas via the rotometer 14. The increase in THC for the sample flow via column T is used in the above formula to determine the water content of the sample.

The following procedures may be utilized to analyze a gas sample for methane, ethane, ethylene, acetylene and $C_3$, $C_4$, $C_5$, $C_6$ and over $C_6$ carbon atom constituents and freons F11, F12, F22 and F113. A first method for analysis is as follows. The sample to be analyzed should be injected into the apparatus via internal sample loop 1 which should be maintained at a temperature of 76° centigrade to 85° centigrade. Sample loop 1 may be filled via R2. T7, T8 and T11 should be opened. Back-pressure regulator 13 should be adjusted to supply capillary C4 with the upstream pressure that was used to analyze the calibration or sample gas for THC. When the THC response is stable, R2 and R7 should be closed. The gas sample input pressure should be removed; and the pressure of the gas in internal sample loop 1 should be relieved to atmospheric pressure. Using R3, the line should be purged with carrier gas. QC3 and QC2 should be connected via an external loop. T1, T3 and T8 should be opened to permit flow through chromatographic column 1. The carrier gas should be regulated to furnish the carrier gas flow required for chromatographic column 1; and the recorder 41 should be zeroed for the carrier gas flow through capillary C4, T11 and the detector 15. For high hydrocarbons, the flow from chromatographic column 1 can be split between capillary C4 and rotometer 14 in any proportion desired. The loop connecting QC2 and QC3 should now be removed; and R1 and T6 opened, thus, initiating carrier sweep of chromatographic column 1 and injection of the sample. The routine determination of the subject impurities is automatically accomplished now by the sweeping of sample loop 1 and chromatographic column 1 with the carrier gas for the specified time that is required to elute these component impurities at the temperature and flow rate characteristic of the column's packing and by noting the corresponding measurements on the recorder. When a moving strip chart is used, the area under the peaks indicates the impurity concentrations in the sample. The particular packing compositions placed in the chromatographic columns 1 and 2 to elute the impurities of interest are well known by those of ordinary skill in the art and may vary depending on the design considerations of a particular embodiment of the invention.

Optionally, when the elapsed time of carrier gas sweeping has been accomplished for eluting the $C_1$ and $C_2$ hydrocarbons, T1 and T3 should be closed; and $T_2$ and $T_5$ should be opened. This reverses the flow of carrier gas in chromatographic column 1 and elutes the retained heavier hydrocarbons out of column 1 as THC. They may be either registered as a single peak on a strip chart recorder or the procedure discussed below may be followed if the THC is not accounted for by the sum of the light $C_1$ and $C_2$ hydrocarbons. When heavier than $C_2$ hydrocarbons are found by the routine back-flushing, T2 and T5 should be closed; and T3 and T4 opened. The carrier gas flow rate should be adjusted to the proper pressure required for sweeping chromatographic column 2; and an additional amount of the sample gas should be injected into the external sample loop 17. The recorder should be started and the carrier gas permitted to sweep the external sample loop and chromatographic column 2 until the heavier hydrocarbons and freons are eluted and registered by the appearance of the peaks (on a strip chart recorder) at times which are charactertic of the component impurities to be eluted at the temperature and flow rate utilized and for the type of carrier gas utilized. Finally, chromatographic column 2 should be backflushed by connecting QC1 with QC3 and QC2 with Q1 to insure that all heavy hydrocarbons are removed prior to reuse of the column.

As an alternate procedure, when the amount of response obtained by the use of the fixed sized internal sample loop 1 is found to be either too small or too large for a proper analysis, an external sample loop of the desired length to obtain the proper size of sample applicable to the THC condition exhibited by the sample gas being analyzed may be used. The procedure for using external sample loop is to loop (without sample) QC3 and QC2, adjust the carrier gas flow rate through chromatographic column 1 to desired amount and split column flow by back-pressure regulator 13, if necessary, or use the entire flow from the column through capillary C4 and valve T11 and proceed as described above from the opening of T1, T3 and T8 onward.

Alternately, when freons are thought to be present, after eluting light hydrocarbons $C_1$ and $C_2$ from chromatographic column 1, close T3 and T1; and open T2 and T4. The carrier gas flow rate should be regulated for backflushing chromatographic column 1 into chromatographic column 2 and out through T8. Chromatographic column 2 should then be utilized to detect freons F11, F12, F22 and F113 by their elution of different times. The freons are noted by their specific peaks on a strip chart recorder. Calibration by use of a gas with a known content of freons is required to determine the value in parts per million of areas under the peaks on a strip chart recorder.

It is obvious that the invention may be practiced otherwise than specifically described above. For example, gases other than air, oxygen and nitrogen may be analyzed by the apparatus. This can be accomplished by using the chromatographic techniques described with columns packed with solid supports and liquid phases appropriate for constituents to be detected in the other gases. The external sampling probe design permits the analysis of liquids using the techniques described. The liquid sample is placed in the external loop and heated; and the gases released thereby from the heated sample are swept with the carrier gas and the products analyzed as described above. Further, the specific type of carrier gas utilized is not critical. For example, zero air, nitrogen, helium or argon gases may be used for this purpose. Additionally, the specific type of flame ionization detector is not critical. Also, when the sensitivity requirements for a particular analysis permit, the use of a thermal detector or some other type of detector is possible. TThe use of other type of valves than the toggle and regulating valves indicated by the drawings to control the flow of carrier and other gases is within the scope of the invention. A proportional or percentage type heat control may be used in lieu of the on-off heat control described above. In general, the material required for the fittings, tubing, valves, pump and regulators for the oxygen gas sample handling apparatus is stainless steel since $C_2H_2$ deterioration occurs when copper and copper alloys are used. If the apparatus is not used for oxygen gas analysis or $C_2H_2$ is not required, brass and copper fittings may be used. Thus, it is seen that many modifications and variations of the present invention are possible in light of the above teachings. It is therefore to be understood that, within the scope of the appended claims, the invention may be practiced otherwise than specifically described.

We claim:

1. A portable chromatographic analysis system suitable for in-field use comprising:
   a plurality of columns connected in parallel;
   a single flame ionization detector connected to receive the output of said columns;
   means for sampling fluids;
   first valve means for selectively connecting said sampling means to one of said columns or directly to said ionization detector;
   second valve means for selectively connecting and disconnecting columns to said flame ionization detector;
   means within one of said columns for converting carbon monoxide/carbon dioxide into hydrocarbons registrable on said flame ionization detector; and
   means connected to said flame ionization detector for monitoring and recording the signal produced by said flame ionization detector when a sample is introduced.

2. The analysis system of claim 1 wherein said converting means comprises a nickel catalyst.

3. The analysis system of claim 1 wherein a second column contains means for converting water into hydrocarbons registrable on said flame ionization detector.

4. The analysis system of claim 3 wherein said carbon monoxide/carbon dioxide converting means comprises a nickel catalyst and said water converting means comprises $CaC_2$.

5. The analysis system of claim 3 wherein a third column contains means for eluting individual hydrocarbons and a fourth column contains means for eluting individual hydrocarbons and freons.

6. The analysis system of claim 5 further comprising third valve means connected to said third and fourth columns for selectively backflushing said third and fourth columns either individually or one into the other.

7. The analysis system of claim 6 wherein the monitoring and recording means comprises:
   a strip chart recorder;
   an amplifier having an input terminal connected to said flame ionization detector and an output terminal connected to said recorder; and
   a single RC feedback network connected between the output terminal and the input terminal.

8. The analysis system of claim 1 wherein the monitoring and recording means comprises:
   a strip chart recorder;
   an amplifier having an input terminal connected to said flame ionization detector and an output terminal connected to said recorder; and
   a single RC feedback network connected between the output terminal and the input terminal.

9. The analysis system of claim 1 wherein said first valve means includes means for controlling the mass flow of said fluid.

10. The analysis system of claim 1 further including means for controlling the temperature of at least one of said columns.

11. The analysis system of claim 1 wherein said sampling means comprises:
    means for sampling and vaporizing cryogenic fluids;
    means for sampling subatmospheric gases; and fourth valve means for alternatively connecting said cryogenic fluid sampling means or said subatmospheric gas sampling means to said first valve means.

12. The analysis system of claim 11 wherein said cryogenic fluid sampling means comprises:
    a sample line;
    a vaporizing coil in said sample line;
    a suction pump having an inlet connected to said vaporizing coil and an outlet connected to said fourth valve means; and
    means for maintaining said coil at a desired temperature.

13. The analysis system of claim 12 wherein said subatmospheric gas sampling means comprises a control valve means for introducing a sample gas at subatmospheric pressure, said control valve means being connected to said sample line between said coil and said suction pump.

14. A method of detecting the presence and concentrations of impurities in a sample fluid via the response of a single flame ionization detector in a chromatographic analysis system comprising the steps of:
    introducing a known quantity of a calibration gas having a known total hydrocarbon concentration into said flame ionization detector;
    monitoring and recording the response of said flame ionization detector to said calibration gas;
    introducing a first quantity of a sample gas into said flame ionization detector;
    monitoring and recording the response of said flame ionization detector to said first quantity of sample gas;
    determining the total hydrocarbon concentration (THC) of said first quantity of sample gas by the relation $$\frac{\text{THC of calibration gas}}{\text{Response of detector to THC of calibration gas}} = \frac{\text{THC of sample gas}}{\text{Response of detector to THC of smaple gas}}$$

converting the carbon monoxide/carbon dioxide in a second quantity of said sample gas into hydrocarbons;

introducing said second quantity of sample gas into said flame ionization detector;

monitoring and recording the response of said flame ionization detector to said second quantity of sample gas; and determining the carbon monoxide/carbon dioxide concentration in said sample gas by the relation $$\frac{\text{Increase in detector's response to said second quantity of sample gas}}{\text{Detector's response to 1 part per million (ppm) total hydrocarbons from calibration gas}} = \text{Carbon monoxide/carbon dioxide, p.p.m. of sample gas.}$$

15. The method of claim 14 including the further steps of:

converting the water in a third quantity of said sample gas into acetylene;

introducing said third quantity of sample gas into said flame ionization detector;

monitoring and recording the response of said flame ionization detector to said third quantity of sample gas; and determining the water concentration in said sample gas by the relation Increase in $THC/1.3 = H_2O$, ppm of sample gas.

* * * * *